United States Patent [19]

Suzuki et al.

[11] Patent Number: 4,964,696

[45] Date of Patent: Oct. 23, 1990

[54] COLOR SEPARATING OPTICAL APPARATUS

[75] Inventors: Minoru Suzuki; Nobutaka Minefuji, both of Tokyo; Osamu Fujimoto, Osaka, all of Japan

[73] Assignees: Asahi Kogaku Kogyo Kabushiki Kaisha, Tokyo; Sharp Kabushiki Kaisha, Osaka, both of Japan

[21] Appl. No.: 295,672

[22] Filed: Jan. 11, 1989

[30] Foreign Application Priority Data

Jan. 12, 1988 [JP] Japan .................................... 63-4424

Jun. 3, 1988 [JP] Japan ............................ 63-73987[U]

[51] Int. Cl.[5] ............................................ G02B 5/22

[52] U.S. Cl. .................................... 350/315; 350/314; 354/71; 354/327

[58] Field of Search ........................ 350/315, 314, 317; 355/71, 88, 326, 327

[56] References Cited

U.S. PATENT DOCUMENTS

| | | | |
|---|---|---|---|
| 3,260,152 | 7/1966 | Aston | 350/314 |
| 4,106,870 | 8/1978 | Kondo et al. | 355/327 |
| 4,305,650 | 12/1981 | Knox | 355/71 |
| 4,351,608 | 9/1982 | Coote et al. | 355/35 |
| 4,723,146 | 2/1988 | Kashara | 355/327 |
| 4,742,371 | 5/1988 | Furuta et al. | 355/4 |
| 4,830,501 | 5/1989 | Terashita | 356/402 |

FOREIGN PATENT DOCUMENTS

| | | |
|---|---|---|
| 2924531 | 1/1980 | Fed. Rep. of Germany . |
| 3615284 | 11/1987 | Fed. Rep. of Germany . |
| 3714490 | 11/1987 | Fed. Rep. of Germany . |
| 3802681 | 8/1988 | Fed. Rep. of Germany . |

*Primary Examiner*—Bruce Y. Arnold
*Assistant Examiner*—Loha Ben
*Attorney, Agent, or Firm*—Sughrue, Mion, Zinn, Macpeak & Seas

[57] ABSTRACT

A color separating optical apparatus is provided with a compensating members in order to compensate for the differences in output energy of the separated colors which is attributable to the particular spectral characteristics of the light source and the light receiver. In various embodiments, selectable masks are used to control the light flux, or the light source itself is controlled as to the number of lamps energized for each color.

4 Claims, 9 Drawing Sheets

COLOR SEPARATING OPTICAL APPARATUS

BACKGROUND OF THE INVENTION

The present invention relates to a color separating optical apparatus which is capable of reading color-separated picture signals using a single light-receiving means.

Conventional types of apparatus contemplated by the present invention include color copying machines, color scanners, etc. The optical system of these apparatus is basically composed of a light source for illuminating the object, an imaging lens unit for focusing reflected light from the object on a light-receiving means such as a CCD or a photoreceptor drum, and a plurality of color-separating filters having different wavelength selection characteristics, which are inserted into the optical path for detecting plural pieces of color information using a single light receiving means.

In this type of apparatus, the color information on the object is color-separated on the basis of the brightness of each of the three primary colors, which necessitates receiving the reflected light from the object several times, with an appropriate filter being selected. The pieces of color-separated information are superposed to produce an output color picture that reproduces the color information of the object.

A problem with the apparatus described above is that the overall spectral characteristics of the system which are determined by the characteristics of the light source and the spectral sensitivity of the light-receiving means are not flat, so that different energies are produced for different colors. This results in the failure to perform effective control of color reproduction since the density of the output color picture will vary from one color to another.

SUMMARY OF THE INVENTION

The present invention solves the aforementioned problems of the prior art. An object of this invention is to provide a color separating optical apparatus that is capable of eliminating the difference between the quantities of output energy for each of the separated colors, produced on account of the overall spectral characteristics of the system.

In order to attain this object, the present invention provides a color separating optical apparatus that comprises an imaging lens unit that allows the reflected light from the object as illuminated with a light source to focus on a light-receiving means disposed at a position generally conjugate to the object, a plurality of color-separating filters which are selectively inserted into the optical path extending from the object to the light-receiving means and which respectively limit the wavelength of the light in such a way that it will reach the light-receiving means at wavelengths in different ranges, and a plurality of light-shielding means that are selectively inserted in the optical path to adjust the quantity of light transmission. In the present invention, the light-shielding means are selected in accordance with the selection of the color-separating filter so as to eliminate the differences between the output energies of each of the separated colors produced on account of the spectral characteristics of the light source and the light-receiving means.

DETAILED DESCRIPTION OF THE PREFERRED EMBODIMENTS

The present invention is described hereinafter with reference to the accompanying drawings.

Figure 1:
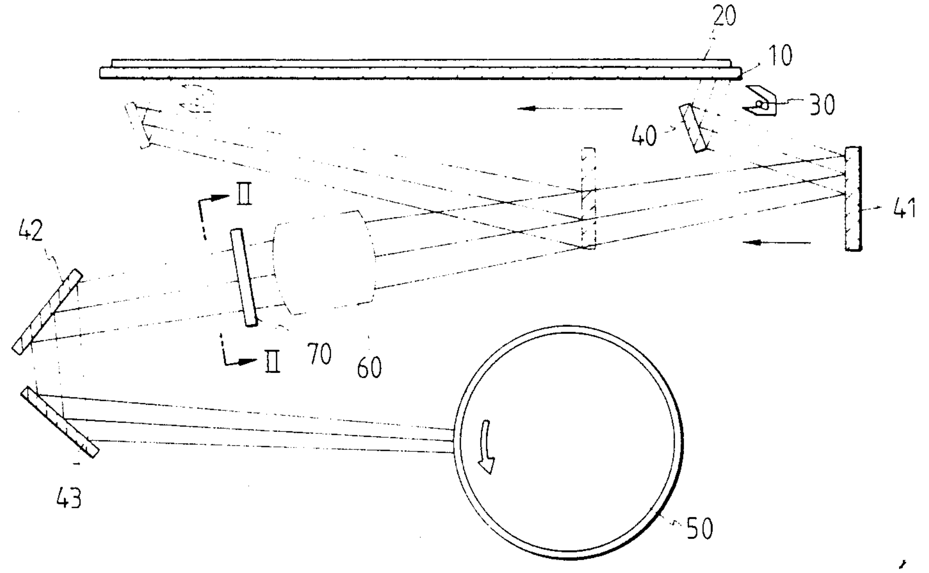
FIG. 1 is a schematic drawing of a color copying machine according to a first embodiment of the color separating optical apparatus of the present invention.

FIG. 1 shows schematically the optical system of a color copying machine according to a first embodiment of the color-separating optical apparatus of the present invention.

The optical system shown in FIG. 1 is chiefly intended to copy, on a different sheet of paper (not shown), a document 20 placed as the object on a contact glass 10. As shown, the system is generally composed of a halogen lamp 30 which is a light source for illuminating the document 20, first to fourth mirrors 40, 41, 42 and 43 which guide the reflected light from the document 20 illuminated with the halogen lamp 30, an imaging lens unit 60 which is disposed between the second and third mirrors to form an image of the document on a photoreceptor drum 50 serving as a light-receiving means, and a filter unit 70 disposed behind but in proximity to the imaging lens unit 60.

Figure 2:
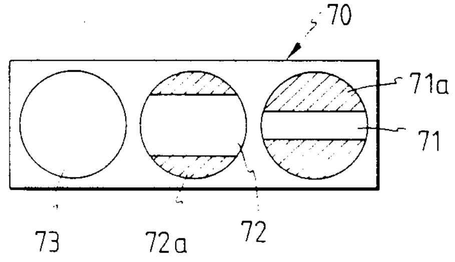
FIG. 2 is a plan view of the filter unit in the apparatus shown in FIG. 1, as seen from direction defined by line II—II in FIG. 1.
Figure 3:
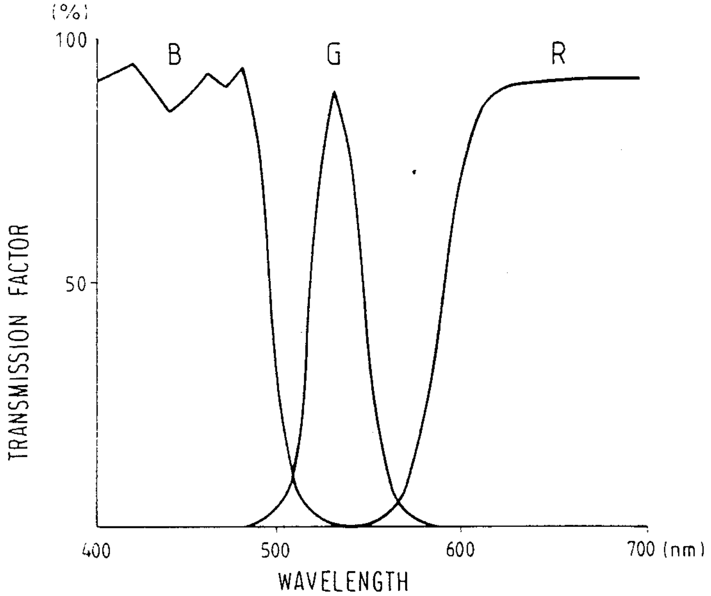
FIG. 3 is a diagram showing the transmission characteristics of the color separating filters.

As shown in FIG. 2, the filter unit 70 has three color-separating filters 71, 72 and 73 for detecting information on the three primary colors (R, red; G, green; B, blue). The spectral transmission characteristics of the respective filters are as shown in FIG. 3. For reasons to be explained later the color separating filters 71 and 72 are equipped with masks *71a* and *72a* (as indicated by hatched areas in FIG. 2) which: serve as light-shielding means for limiting the cross-sectional area of the transmitted light.

The system shown in FIG. 1 is designed so that the light reflected from the document 20 is guided by the mirrors, filters and lenses to perform slit exposure on the photoreceptor drum 50. When reading the document, the halogen lamp 30 and the first and second mirrors 40 and 41 scan in the direction indicated by the arrows and the information associated with each scanning position is continuously read onto the photoreceptor drum 50.

The light issuing from the halogen lamp 30 employed in this apparatus has spectral characteristics characterized by an increase in energy toward the longer wavelengths. In contrast, the photoreceptor on the drum 50 has a spectral sensitivity curve which has a peak at about 550 nm as shown by the broken line in FIG. 4. Therefore, the overall spectral characteristics of the system are not flat but have an increasing gradient toward the longer wavelengths.

Figure 5:
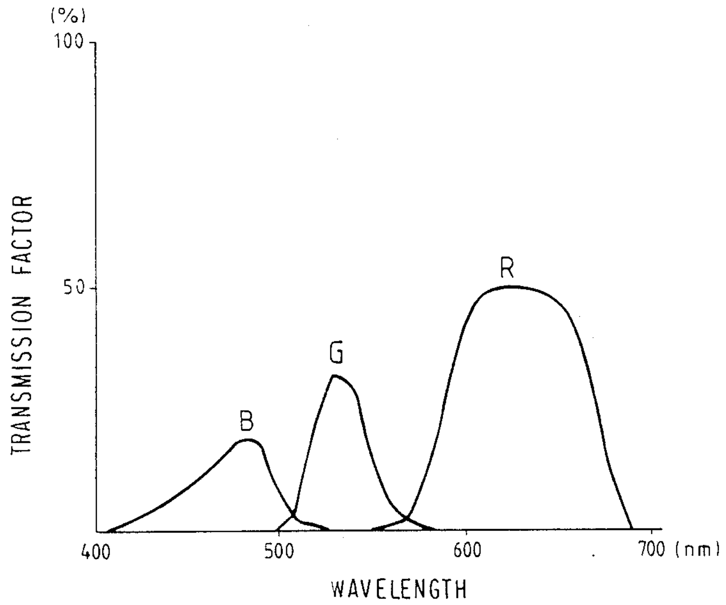
FIG. 5 is a diagram showing the spectral characteristics of the apparatus shown in FIG. 1 when not furnished with light shields.

If color separating filters having the characteristics shown in FIG. 3 are selectively inserted into the optical path in such a way that the information from the document 20 is color-separated using light beams whose luminous flux has the same cross-sectional area for each color, even areas on the document 20 having the same level of luminance will produce energy whose amount varies with color as shown in FIG. 5. If, in the example shown, the output energy of the B component is assumed to be 100, the G and R components will produce outputs of 111 and 386, respectively, for the same input energy level. Therefore, if not corrected, a hard copy will be obtained in which blues are reproduced faithfully but in which vermilion or other shades of red have produced unclear images.

In order to avoid this problem, as already stated, the color separating filters 71 and 72 in the filter unit 70 are furnished with masks *71a* and *72a* as light shields, and the diameter of each mask is adjusted so that the cross-sectional area of the luminous flux of the light beams passing through the associated filter provides a ratio of 100/111 for the G component and 100/386 for the R component, with the value for B component being assumed to be 100.

The operation of the color copier described above proceeds as follows. First, the color separating filter 71 for the R component in the filter unit 70 is inserted into the optical path and at the same time, the surface of the photoreceptor drum 50 is positively charged by corona discharge using a charger (not shown).

In the next step, the halogen lamp 30 is lit and remains illuminated as it is slid beneath the contact glass 10 together with the first and second mirrors 40 and 41. The light reflected from the document 20 is guided by the first and second mirrors 40 and 41, passes through the color separating filter 71 for the R component, and emerges therefrom as a light beam carrying only that information related to the R component. As a result of passage through the filter 71, the light has its cross-sectional area (luminous flux) reduced by the mask *71a*.

The light emerging from the lens unit 60 passes through the filter unit 70 and is reflected by the third and fourth mirrors 42 and 43 to perform slit exposure on the photoreceptor drum 50. Note, however, that filter unit 70 can also be positioned before the lens unit 60. Since the electrical resistance of the photoreceptor layer on the drum 50 varies with the intensity of light, the positive charges on the intensely illuminated areas will disappear and those in the weakly illuminated areas will remain intact, thereby forming a latent electrostatic image on the surface of the drum 50 in a pattern corresponding to the amount of R component exposure. The particles of a toner of a cyan color which is complementary, to the R component are then deposited on the latent image and the resulting toner image is transferred to paper by corona discharge. As a result, only the image of the cyan color which is complementary to the R component is formed on the copy paper.

Thereafter, the filter unit 70 is shifted in a direction normal to the paper of FIG. 1 and the color separating filter 72 for the G component is inserted into the optical path. By repeating the same procedure as described in the preceding paragraph, a latent electrostatic image is formed on the photoreceptor drum 50 in a pattern corresponding to the amount of G component exposure. As light beams pass through the filter 72, the cross-sectional area of the luminous flux is restricted to a predetermined value by the mask *72a*.

Particles of a toner of magenta color, which is complementary to the G component, are deposited on the latent image and the resulting toner image is transferred to the paper in registry with the previously formed cyan toner image. As a result, both the cyan image, which is complementary to the R component, and the magenta image, which is complementary to the G component, are formed on the copy paper.

Thereafter, the filter 73 for the B component is inserted into the optical path and the above-described procedures are repeated to form an image of a yellow color which is complementary to the B component, and this image is superposed on the two previously formed toner images. As a result, the three colors cyan, magenta and yellow, are superposed in registry to reproduce the information of the document 20 on the copy paper.

In the final step, the superposed images are fixed and the copy paper emerges from the machine.

As described above, in accordance with the present invention, the cross-sectional area of the luminous flux of light is adjusted to match the specific color whose information is to be detected. By so doing, the difference in the quantity of output energy with color that is produced on account of the overall. spectral characteristics of the system can be sufficiently suppressed to provide improved color reproduction. In this connection, it should be mentioned that the filter unit 70 may be inserted in the optical path behind the imaging lens unit 60, rather than in front of it as in the embodiment described above.

Figure 6:
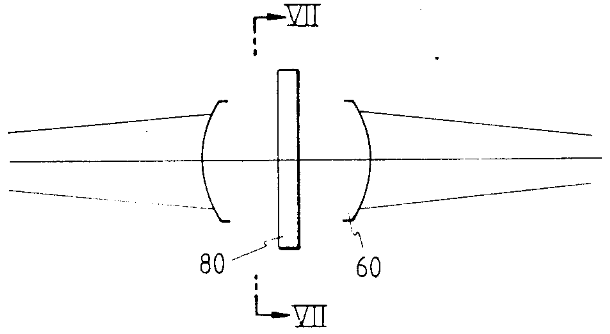
FIG. 6 is a schematic drawing showing a modification of the apparatus shown in FIG. 1.
Figure 7:
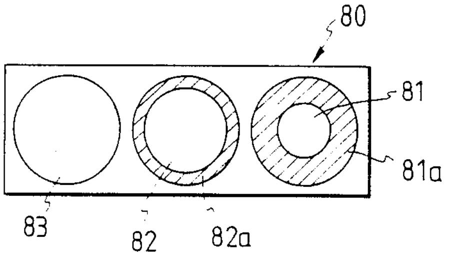
FIG. 7 is a plan view of the filter unit shown in FIG. 6.

FIG. 6 shows a modification of the first embodiment of the present invention, in which a filter unit 80 designed as shown in FIG. 7 is disposed at a position corresponding to a diaphragm stop in the opening between the two outermost surfaces of the imaging lens unit 60. This filter unit 80 has three color-separating filters 81, 82 and 83 which perform the same functions as those described in connection with the first embodiment, except that each of the masks 81a and 82a serving as a light shield is in the form of a circle whose center is in alignment with the optical axis of the imaging lens unit 60.

The circular masks 81a and 82a offer the following advantages: they serve as diaphragm stops to increase the depth of focus during the reading of information related to the R and G components, and the effects of axial chromatic aberration occurring in the optical system can be sufficiently reduced to provide improved imaging performance.

Figure 8:
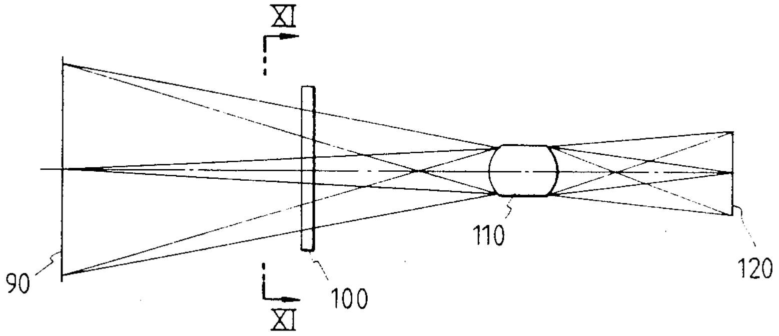
FIG. 8 is a schematic drawing showing the essential parts of a color scanner according to a second embodiment of the color separating optical apparatus of the present invention.

FIG. 8 schematically shows essential parts of the optical system in a color scanner according to a second embodiment of the color separating optical apparatus of the present invention.

In this optical system, the light reflected from a document 90 illuminated with a light source (not shown) is guided through a filter unit 100 and an imaging lens unit 110 which focuses an image on CCD 120 serving as a light-receiving means.

Figure 9:
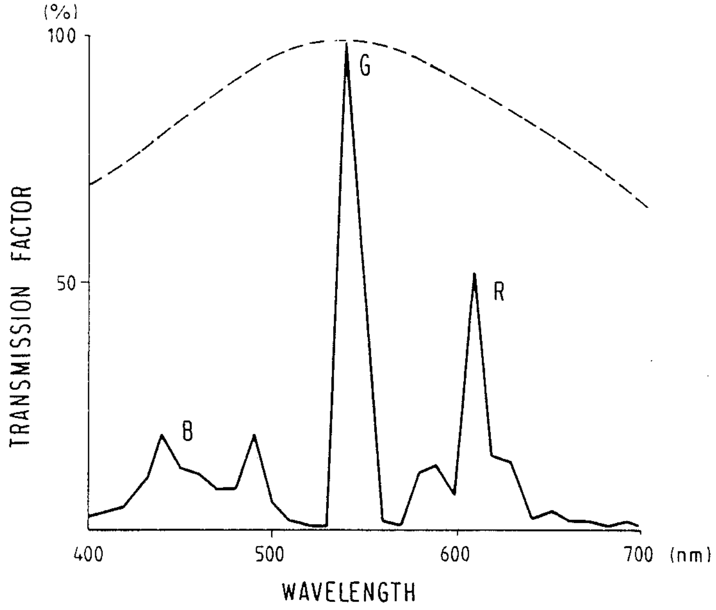
FIG. 9 is a diagram of the spectral characteristics of the light source and the light-receiving means employed in the apparatus shown in FIG. 8.

The fluorescent lamp which is used as the light source in this system has spectral characteristics as shown by the solid line in FIG. 9, and the CCD 120 has a spectral sensitivity curve as shown by the broken line in the same drawing. Therefore, as in the case of the first embodiment, the overall spectral characteristics of the system have an increasing gradient toward the longer (red) wavelengths.

Figure 10:
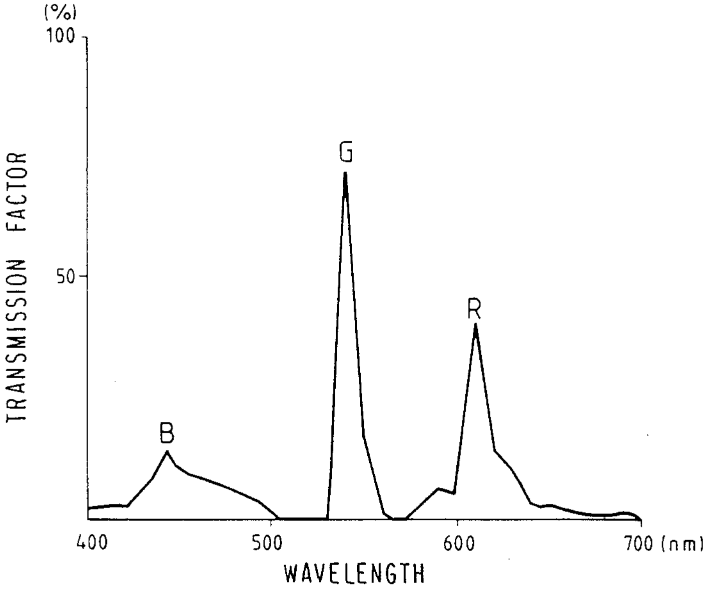
FIG. 10 is a diagram showing the spectral characteristics of the apparatus shown in FIG. 8 when not furnished with light shields.

If color separating filters having the characteristics shown in FIG. 3 are selectively inserted into the optical path in such a way that the information in the document 90 is color-separated using light beams whose luminous flux has the same cross-sectional area for each color, areas on the document 90 having the same level of luminance will produce energy whose amount varies with color as shown in FIG. 10. If, in the example shown, the output energy of the B component is assumed to be 100, the G and R components will produce outputs of 114 and 144, respectively, for the same input level of energy.

Figure 11:
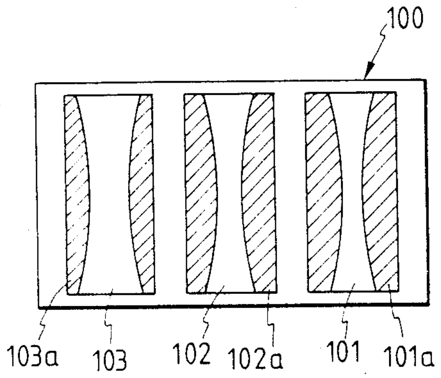
FIG. 11 is a plan view of the filter unit in the apparatus shown in FIG. 8, as seen from the direction defined by line XI—XI in FIG. 8.

In order to ensure that uniform energy will be produced from the colors obtained by color separation, the apparatus under consideration employs color separating filters 101, 102 and 103 which, as shown in FIG. 11, are furnished with masks 101a, 102a and 103a on their respective surfaces, and the diameter of each mask is adjusted so that the cross-sectional area of the luminous flux of the light passing through the associated filter provides a ratio of 100/114 for the G component and 100/144 for the R component, with the value for the B component being assumed to be 100.

Each of the masks used in the second embodiment is designed so that it will block the central portion of the incident light beam in a greater amount than the peripheral edge. In other words, by achieving a relative improvement in the brightness of the edge of the image field, an unevenness in the quantity of light that would otherwise occur at the CCD 120 because of the cosine-fourth-power law is suppressed.

In the first and second embodiments of the present invention described above, the light shields are attached as masks on the surface of the associated color separating filters. Needless to say, the light shields may be provided as members separate from the filters although it becomes necessary to provide separate means for moving the light shields in addition to the means for moving the filters.

Instead of masks which adjust the cross-sectional area of the luminous flux of the incident light, ND (neutral density) filters having different transmittances may be employed as a means for changing the output energy for each color.

Figure 12:
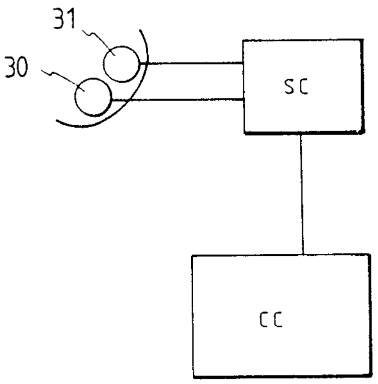
FIG. 12 is a block diagram showing the composition of a light source usable in the apparatus shown in FIG. 1.

A further embodiment of the invention is shown in FIG. 12, which illustrates an alternative light source which is usable with the system structure shown in FIG. 1.

As shown in FIG. 12, the light source comprises two halogen lamps 30 and 31, and a switching circuit SC which allows either one or both of these halogen lamps to be lit as required in the scanning mode to be described below. The switching circuit SC is controlled by a one-bit signal from a central control circuit CC which controls the entire system of the copier in such aspects as scanning and filter selection.

Figure 13:
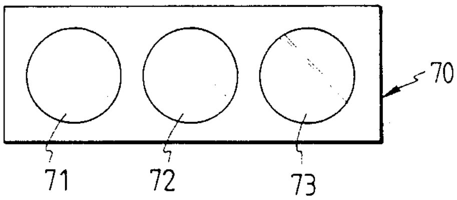
FIG. 13 is a plan view of the filter unit in the apparatus shown in FIG. 1.

As shown in FIG. 13, the filter unit 70 has three color-separating filters 71, 72 and 73 for detecting information in the three primary colors. These filters are selectively inserted into the optical path in response to a signal supplied from the central control circuit CC.

Figure 14:
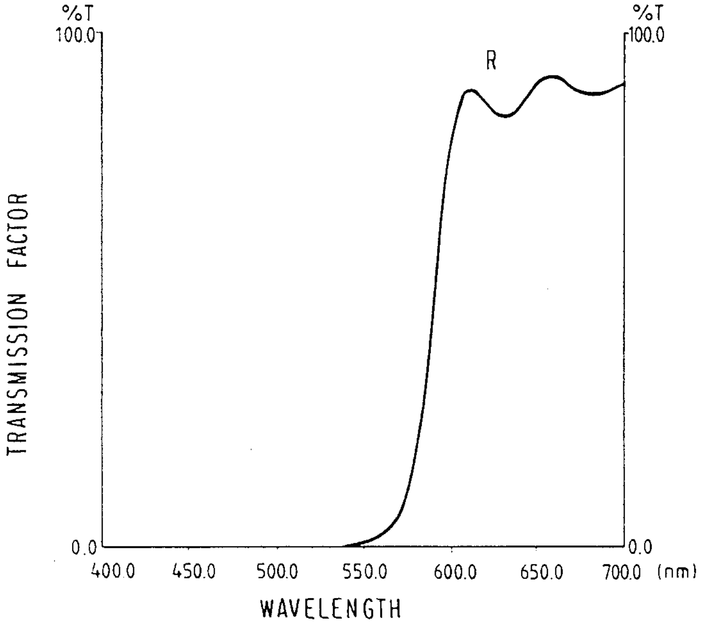
FIG. 14 is a diagram showing the transmission characteristics of a filter for the R component.
Figure 15:
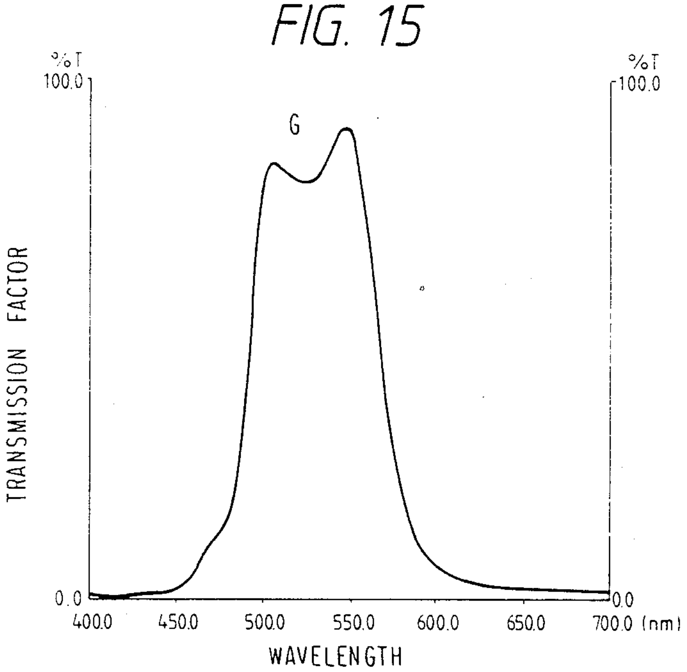
FIG. 15 is a diagram showing the transmission characteristics of a filter for the G component.
Figure 16:
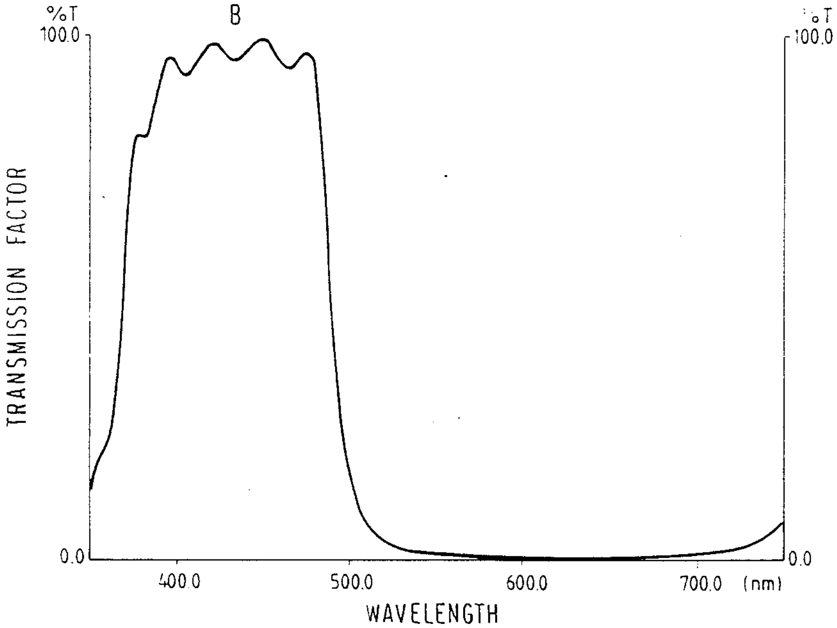
FIG. 16 is a diagram showing the transmission characteristics of a filter for the B component.
Figure 17:
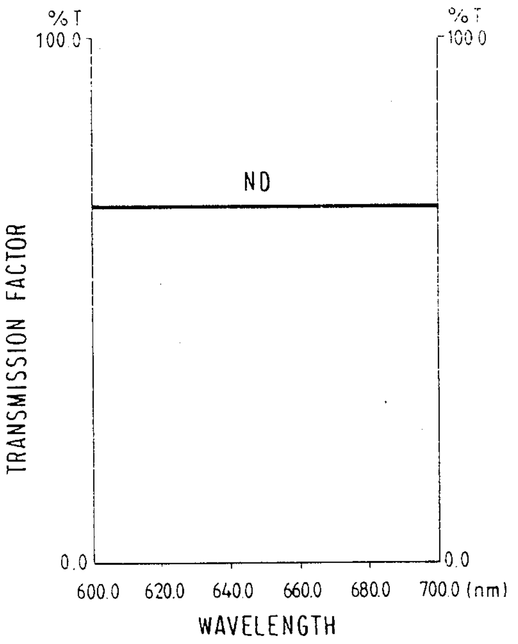
FIG. 17 is a diagram showing the transmission characteristics of an ND coating layer.
Figure 18:
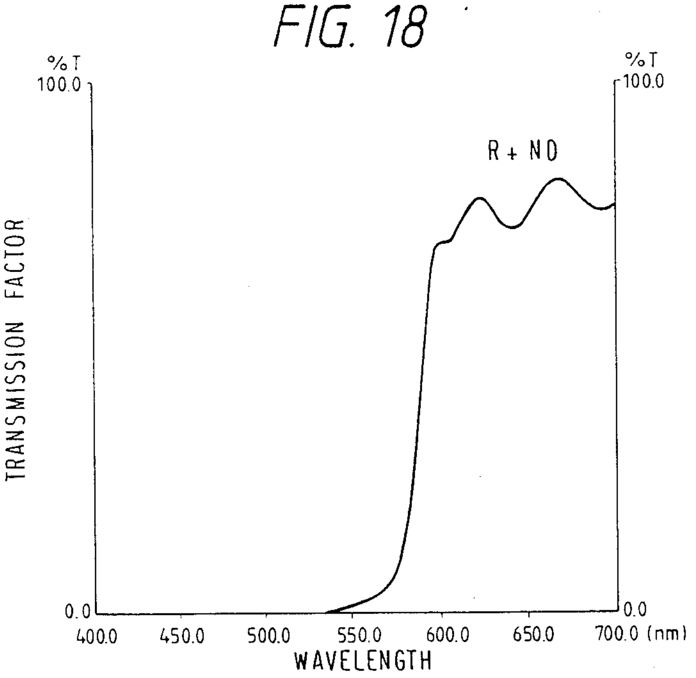
FIG. 18 is a diagram showing the transmission characteristics of a filter for the R component which is coated with an ND layer.

FIGS. 14–16 show the spectral transmission characteristics of the color-separating filters; FIG. 14 shows the characteristics of the filter 71 for the R component, FIG. 15, the filter 72 for the G component, and FIG. 16, the filter 73 for the B component. For the reasons described below, the filter 71 for the R component is coated with a neutral density (ND) layer having a transmittance of 70% (see FIG. 17) which reduces uniformly the energy of the incident luminous flux over the entire region of its cross section. FIG. 18 shows the spectral transmission characteristics of the filter 71 coated with this ND layer.

The system shown in FIG. 1 is designed so that the light reflected from the document 20 is guided by the mirrors, filters and lenses to perform slit exposure on the photoreceptor drum 50. When reading the document, the halogen lamps 30 and 31 of this embodiment and the first and second mirrors 40 and 41 scan in the direction indicated by arrows in FIG. 1 and the information associated with each scanning position is continuously read onto the photoreceptor drum 50.

Figure 4:
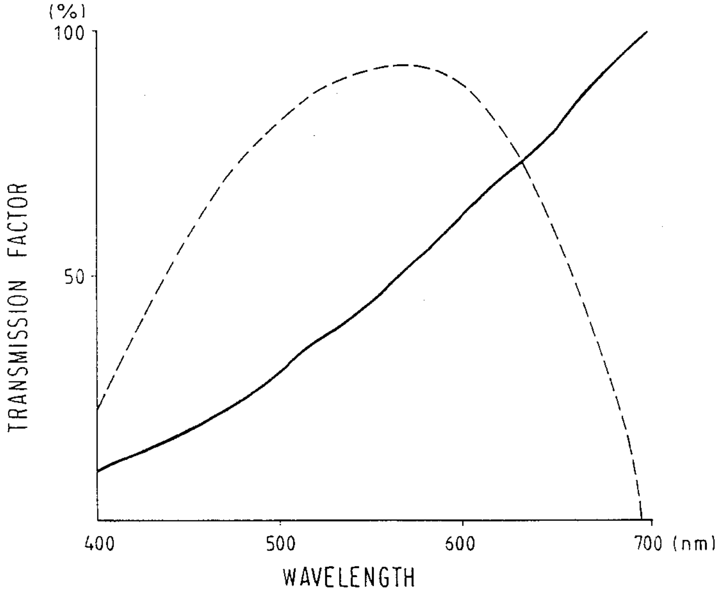
FIG. 4 is a diagram showing the spectral characteristics of the light source and light-receiving means employed in the apparatus shown in FIG. 1.

The light issuing from the halogen lamps employed in this embodiment has spectral characteristics which, as shown by a solid line in FIG. 4, are characterized by an increase in energy toward the longer wavelength side. In contrast, the photoreceptor on the drum 50 has a spectral sensitivity curve which has a peak at about 550 nm as shown by a broken line in FIG. 4. Therefore, the overall spectral characteristics of the system are not flat but have an increasing gradient toward the longer wavelength side.

If color separating filters having the characteristics shown in FIGS. 14–16 are selectively inserted into the optical path without adopting any other means for limiting the energy for each color, areas on the document 20 having the same level of luminance will produce energy whose amount varies with color as shown in FIG. 5. Therefore, if no countermeasures are taken, a hard copy will be obtained in which blues are reproduced faithfully but which fails to produce a clear image in vermilion or other shades of red.

In order to avoid this problem, the switching circuit SC in the system of the present invention allows both halogen lamps 30 and 31 to be lit when light in the range of low spectral sensitivity is being received (i.e., when the filter 73 for the B component is selected), whereas it allows only one of the halogen lamps to be lit when light in the range of higher spectral sensitivity is being received (i.e., when the filters 71 and 72 for the G and the R components are selected). Furthermore, the energy of the luminous flux passing through the filter 71 for the R component is reduced by an ND layer coated on that filter. As a result of the combination of these effects, the output energy from the reception of light of the B component is increased whereas the output energy from the reception of light of the R component is reduced, and each of these energy outputs can be made equal to that produced when light of the G component is received, thereby allowing a substantially uniform output level to be maintained for each of the three components R, G and B.

The operation of the color copier described above proceeds as follows. First, the filter 71 for the R component in the filter unit 70 is inserted into the optical path and at the same time, the surface of the photoreceptor drum 50 is positively charged by corona discharge with a charger (not shown).

In the next step, only halogen lamp 30 is lit and continues to be illuminated as it is slid beneath the contact glass 10 together with the first and second mirrors 40 and 41. The light reflected from the document 20 is guided by the first and second mirrors 40 and 41, passes through the imaging lens unit 60, passes through the filter 71 for the R component, and emerges therefrom as light beams carrying only the information related to the R component. In this case, by the action of the ND layer coated on the filter 71, the energy of the luminous flux of the light passing through that filter is uniformly reduced over the entire region of its cross section.

The light emerging from the filter unit 70 and is reflected by the third and fourth mirrors 42 and 43 to perform slit exposure on the photoreceptor drum 50. Again, the filter unit 70 may be positioned before the lens unit 60. Since the electrical resistance of the photoreceptor layer on the drum 50 varies with the intensity of light, the positive charges on the intensely illuminated areas will disappear and those in the weakly illuminated areas will remain intact, thereby forming a latent electrostatic image on the surface of the drum 50 in a pattern corresponding to the amount of exposure. Toner of cyan color is then deposited on the latent image and the resulting toner image is transferred to copy paper by corona discharge.

Thereafter, the filter unit 70 is shifted in a direction normal to the paper of FIG. 1 and the color separating filter 72 for the G component is inserted into the optical path. By repeating the same procedures as described in the preceding paragraph and with only halogen lamp 30 kept lit, a latent electrostatic image is formed on the photoreceptor drum 50 in a pattern corresponding to the G component exposure.

Toner of magenta color is deposited on the latent image and the resulting toner image is transferred to the paper in registry with the toner image already formed. As a result, both the cyan image and the magenta image are formed on the copy paper.

Thereafter, the filter 73 for the B component is inserted into the optical path and scanning is performed with both halogen lamps 30 and 31 kept lit, so as to form a latent electrostatic image in a pattern corresponding to the amount of B component exposure. Toner of a yellow color is deposited on this latent image, with the resulting toner image being transferred to the paper, so that the three colors cyan, magenta and yellow, are superposed in registry to reproduce the information of the document 20 on the copy paper.

In the final step, the superposed images are fixed and the copy paper emerges from the machine.

The amount of exposing light and the transmission characteristics of the filters may be adjusted to match the specific color whose information is to be detected. By so doing, the difference in the quantity of output energy with color that is produced on account of the overall spectral characteristics of the system can be sufficiently suppressed to provide improved color reproduction.

In the embodiment just described, the amount of exposing light is adjusted and an ND layer is coated only on the filter for the R component. If desired, ND layers having different transmittances may be coated on the filters for the R and G components, with the amount of exposing light being held constant. In this alternative case, exposing light cannot be utilized as effectively as in the first case because the transmittance of the filter for the R component must be held at a considerably low level in order to adjust the level of the energy of the received light of the R component to that of the energy of the B component.

The embodiments described above concern the case where the concept of the present invention is applied to an apparatus having greater sensitivity in the longer wavelength range. It should, however, be noted the concept of the present invention is also applicable to an apparatus having greater sensitivity in the shorter wavelength range, provided that measures similar to those described above are employed, such as the use of an energy attenuating layer on the surface of the filter for the B component.

As described in the foregoing, the present invention ensures that nonuniformity that would otherwise be introduced into the correspondence between color and output energy due to the overall spectral characteristics of the system can be substantially eliminated by adopting one of the optical arrangements specified herein, including coating the surface of a color separating filter with an energy-attenuating layer that reduces the energy of the luminous flux in a manner not specific to wavelength. Furthermore, this attenuating layer allows the energy to be uniformly reduced over the entire region of its cross section, so that the balance in the distribution of light within a picture will not be upset even if the associated filter is disposed at a position that may affect imaging performance.

The above-described feature of the present invention may be combined with an adjustment in the amount of exposing light. In this case, the output energy of the light in the range of low spectral sensitivity is increased whereas the output energy of the light in the range of higher spectral sensitivity is reduced so as to adjust the two levels of output energy to that of light in the intermediate sensitivity range. By so doing, one is capable of avoiding an undue decrease in the energy of received light that world otherwise result from the use of an attenuating layer having low transmittance.

If light shields having a circular opening are disposed at a position corresponding to a diaphragm stop in the aperture of an imaging lens unit, the effects of axial chromatic aberration can be sufficiently reduced by the diaphragm effect to provide improved imaging performance.

If light shields are designed to block the central part of the incident light beams in a greater amount than at the peripheral edge thereof, they are made capable of reducing unevenness in the quantity of light that would otherwise occur at the light-receiving means on account of the operation of cosine-fourth-power law.

What is claimed is:

1. A color separating optical apparatus, comprising: an imaging lens unit having an optical axis for collecting and focussing light reflected from an object illuminated with a light source; light-receiving means disposed at a position generally conjugate to the object and receiving focussed light; a plurality of color separating filters selectively inserted into the optical path extending between said object and said light-receiving means which respectively limit the wavelengths of light components passing therethrough such that the light components reaching said light-receiving means are at wavelengths in respectively different ranges, and a plurality of light-shielding means selectively inserted into said optical path for adjusting the luminous flux of light transmission, said light-shielding means being selected in accordance with the selection of said color-separating filters so as to eliminate the difference in output energies of each separated color attributable to the spectral characteristics of said light source and said light-receiving means, wherein said light-shielding means are disposed at a position distant from said imaging lens unit and are constructed to block the central portion of the beam of said light in a greater amount than peripheral edges thereof.

2. A color separating optical apparatus, comprising: and imaging lens unit for collecting and focussing light reflected from an object illuminated with a light source; light-receiving means disposed at a position generally conjugate to the object and receiving focussed light; and a plurality of color-separating filters selectively inserted into the optical path between said object and said light-receiving means which respectively limit the wavelengths of light components passing therethrough such that the light components reaching said light receiving means are at wavelengths in respectively different ranges, at least one of said color-separating filters being provided with an energy attenuating layer for reducing the luminous flux of incident light in a manner not specific to wavelength and uniformly over the entire cross section of luminous flux, so as to eliminate the difference in output energies of each separated color attributable to the spectral characteristics of said light source and said light-receiving means.

3. A color separating optical apparatus according to claim 2, wherein said light source comprises plural lamps and a switching circuit for controlling the lamps which are lit to eliminate said difference.

4. A color separating optical apparatus, comprising: an imaging lens unit for collecting and focussing light reflected from an object illuminated with a light source; light-receiving means disposed at a position generally conjugate to the object and receiving focussed light; and a plurality of color-separating filters selectively inserted into the optical path between said object and said light-receiving means which respectively limit the wavelengths of light components passing therethrough such that the light components reaching said light receiving means are at wavelengths in respectively different ranges, at least one of said color-separating filters being provided with an energy attenuating layer for reducing the luminous flux of incident light in a manner not specific to wavelength and uniformly over the entire cross section of luminous flux, so as to eliminate the difference in output energies of each separated color attributable to the spectral characteristics of said light source and said light-receiving means, wherein an amount of exposing light of said light source is adjustable.

* * * * *